Patented Sept. 2, 1952

2,609,356

UNITED STATES PATENT OFFICE 2,609,356

MANUFACTURE OF BRIGHT, STABLE, AND LIGHTPROOF SULFONAMIDE RESINS

Erik Birger Bengtsson, Karlskoga, Sweden, assignor to Aktiebolaget Bofors, Bofors, Sweden, a joint-stock company of Sweden No Drawing. Application December 14, 1949, Serial No. 133,014. In Sweden February 17, 1949

9 Claims. (Cl. 260—70)

This invention relates to the manufacture of synthetic resins, particularly from aromatic sulphonamides and formaldehyde, and is especially directed to a novel method whereby a condensation product may be obtained having high stability, good solubility and predetermined drop point, substantially colorless, transparent and impervious to effects of light.

Several methods have been suggested for producing synthetic resins by condensation of an aromatic sulphonamide with formaldehyde, benzaldehyde, furfural or the like or mixtures of formaldehyde and other aldehydes, as for example in United States Letters Patent 1,840,596–7, granted January 12, 1932, and 1,907,554 and 1,908,159, granted May 9, 1933.

Sulphonamide resins produced in accordance with prior practices, however, are unsuited to many uses, generally on account of undesirable crystalline structure and/or solubility characteristics, dark color, lack of homogeneity and other properties.

It is accordingly a principal object of the present invention to provide a novel method for producing as a condensation product of an aromatic sulphonamide and formaldehyde a substantially colorless, stable, synthetic resin of a high quality and impervious to light.

A further object is to provide a method of manufacture of sulphonamide resins whereby the drop point of the ultimate product may be controlled in accordance with the requirements of the purpose for which the resin is to be used.

Other objects, purposes and advantages of the invention will hereafter appear or will be understood from the following description of its practice in the manufacture of synthetic resins of the general class to which the invention relates, during which by way of example procedures for producing a number of resins of different characteristics will be described.

In general the invention contemplates the production of synthetic resin by a condensation reaction in which the characteristics of the product to be produced are anticipated and the conditions under which the reaction occurs are controlled accordingly. In the manufacture of clear and substantially colorless resins in accordance with the invention a high degree of purity in the starting ingredients is desirable although if relatively pure ingredients are unavailable minor impurities may be removed or their effects counteracted by employment of a suitable solvent or extraction medium in the condensation mass. For this purpose hexametaphosphate is generally satisfactory and permits the recovery of a final product having substantially the same properties as those obtained when the starting ingredients are substantially pure.

Ordinarily p-toluene sulphonamide and formaldehyde in water solution at a concentration in the neighborhood of 35% are employed as starting ingredients and an excess of the latter above equimolecular proportions in relation to the quantity of the sulphonamide used is required. Desirably this excess of formaldehyde is such as to result in the presence of at least 15% thereof in the water phase remaining at the conclusion of the reaction, during the course of which its pH value should be controlled within relatively narrow limits. Thus while the pH value of the formaldehyde solution in the reaction mixture may lie at any value within the range 3–6 it is preferable that it be not less than 4 or greater than 5 and it should be determined during the course of the reaction and adjusted accordingly if found to be outside this range.

A suitable vessel for carrying out the condensation reaction may be equipped with heating apparatus, an agitator and a reflux condenser and include an adjustable tap or blow leg; the charge after introduction thereto is heated gradually while being subjected to constant stirring until a refluxing temperature of approximately 100° C. is attained. Preferably during the course of this initial heating, for example when the charge is at about 50° C., the pH value of its formaldehyde content should be tested and adjusted if necessary to bring it within the range 4–5. The initial refluxing temperature should be maintained and the charge continuously stirred for about three hours, at the conclusion of which the charge may be allowed to cool, the formaldehyde solution separated from the resin layer by drawing off through the tap or blow leg, and the retained resinous condensate then washed with softened water or a dilute formaldehyde solution and stirred under suction until the contents of the vessel have been substantially freed from water and uncombined formaldehyde. The temperature is then gradually raised to 130° C., preferably until a test of the charge discloses that its drop point has reached the neighborhood of 70°–80° C.; thereupon a further quantity of formaldehyde solution of substantially the same strength and pH value as that initially employed may be added to the charge and the latter then heated under reflux as before. The charge is stirred throughout this latter treatment, which should continue until the maximum conversion of the original sulphonamide to a condensation product has been accomplished, and, after cooling, the excess formaldehyde solution is withdrawn, the condensate again washed, dried under suction and re-heated to 130° C. during stirring for a further period until the drop point of the product has reached the value sought. If a relatively high drop point in the neighborhood of 90° C. or higher is required it is sometimes desirable that the final heating at 130° C. be carried out under vacuum to accelerate attainment of this result.

Synthetic resins made in accordance with the procedure just described are characterized by good stability in solutions; are generally substantially colorless or of light color and are highly resistant to deteriorating effects of light. By maintaining a fairly accurate control of the pH value of the formaldehyde solution during the reaction and relatively high concentration of uncombined formaldehyde throughout those stages in which any of it is present, resins are produced containing a higher proportion of formaldehyde in their composition than has been obtainable by the practices heretofore known; it is believed such resins are probably composed of methylol compounds containing polymeric formaldehyde.

These resins are susceptible of treatment to increase their hardness appreciably without impairment of other good properties by the employment of a quantity of urea or phenol in the initial reaction charge, the proportion in the latter preferably not exceeding 10%.

On the other hand by reaction with alcohols, for example ethyl and butyl alcohol, relatively soft products can be produced which are useful for many purposes, the alcohol treatment either being combined with the condensation reaction or conducted after a non-softened resin has been obtained in accordance with the procedure herein described.

In accordance with the following examples of the practice of the invention, which are stated for the purposes of illustrating the manner in which it may be practised but without restricting its scope, resins of the general class contemplated by the invention may be produced having specific characteristics differing in certain respects to adapt them respectively for the general purposes for which they are to be employed.

Example 1.—Into a reaction vessel made of acid-proof steel provided with heating apparatus, an agitator, reflux condenser and an adjustable blow leg or tap, a charge is introduced consisting of 700 kg. p-toluene sulphonamide and 430 kg. formaldehyde (35%–36%) with 12 kg. sodium hexametaphosphate to contain impurities from the other ingredients. The charge is heated and continuously stirred and when it reaches 50° C. a formaldehyde sample is withdrawn, its pH value determined, adjustments if necessary are made to bring the pH value to within the 4–5 range, and the heating is continued by boiling under reflux conditions with constant stirring for approximately three hours. Heating is then suspended, the charge allowed to cool, the formaldehyde layer then withdrawn from the vessel through the blow leg, and the resinous condensate remaining washed with softened water or with a dilute formaldehyde solution. Then with the aid of stirring and suction remaining traces of water and uncombined formaldehyde are removed and the condensate gradually heated to 130° C. This temperature is maintained until a test discloses a drop point of 70°–80° C. has been reached whereupon 270 kg. of the formaldehyde solution (35%–36%) are added and the mixture of formaldehyde and the condensate boiled for three hours under reflux while the charge is being constantly stirred. At the end of this period the formaldehyde solution is withdrawn, the condensate again washed and freed of water and uncombined formaldehyde under stirring and suction, the temperature again raised to 130° C. and maintained until a drop point of 89°–90° C. has been reached when the resin may be cooled and used.

Example 2.—In similar apparatus 700 parts by weight of a mixed sulphonamide consisting of a mixture of isomeric toluene sulphonamides obtained as a by-product from the manufacture of saccharine are treated with 520 parts of a 35% formaldehyde solution and under pH control as described in Example 1 up to the second addition of formaldehyde solution. Then the resinous condensate remaining in the vessel may be utilized without further treatment if desired.

Useful resins may be produced in accordance with either of the above described procedures using instead of the toluene sulphonamide other suitable compounds of the same group, e. g. benzene sulphonamide or the mixture of isomeric toluene sulphonamides obtained through the amidation of crude sulphonyl chloride directly after the congealing of the p-toluene sulphonyl chloride.

Example 3.—If in the procedure described under Example 1 the condensation product is held under a vacuum during each heating period at 130° C. the drop point of the resinous product can be increased to about 110° C. without appreciable impairment of other properties of the resin or material change in the solubility.

Example 4.—If after the first heating of the resinous product at 130° C. in accordance with the procedure described under Example 1 the desired drop point has been attained, the second refluxing with formaldehyde may be omitted and para-formaldehyde (trioxymethylene) stirred into the melted resin until thoroughly blended therewith.

Example 5.—When using urea the starting mixture may consist of approximately 5 parts of urea, 95 parts of p-toluene sulphonamide and 100 parts of 36% formaldehyde which is treated as in Example 1, an additional 100 parts of 36% formaldehyde being supplied for the second refluxing stage, and if the heating of the resinous condensate at 130° C. is carried out in vacuo a drop point in the neighborhood of 118° C. is attained in a final product with good solubility properties.

Example 6.—If p-toluene sulphonamide and a small quantity of phenol are boiled with formaldehyde in the presence of ammonia and treated in accordance with either of the methods of Examples 1 and 2, a resin is obtained the drop point of which is about 100° C.

Example 7.—100 parts of p-toluene sulphonamide and 100 parts of 35% formaldehyde may be boiled under reflux for one hour; then after separation of the resinous condensate the latter is boiled under reflux for six hours with 100 parts of methanol, the excess methanol distilled off and the residual condensate heated at 130° C. until a drop point of 65° C. is reached. A generally similar product may be obtained if a previously prepared sulphonamide resin is treated with methanol or other generally comparable alcohol.

*Example 8.*—An original charge containing 100 parts of p-toluene sulphonamide, 30 parts of urea and 100 parts of 35% formaldehyde boiled and refluxed during stirring for one hour results in a condensate which after separating, boiling under reflux with 100 parts of ethanol for six hours and then heating to 130° C., produces a resin the drop point of which is 90° C.; a similar procedure excluding urea affords a resinous product having a drop point of 65° C.

The drop point of the resins to which reference is herein made is determined with the aid of an oil bath and a glass tube 125 mm. in length, 14 mm. in diameter throughout most of its length but converging in the 12 mm. at its lower end to an axial orifice 4 mm. in diameter. The tube, held vertically, is filled with the resin in small pieces up to about 2–5 cm. above its lower constricted end and warmed in an oil bath while the bath is being stirred and heated to raise its temperature 3° C. per minute. When the resin is soft the bulb of a thermometer is placed in it and the heating continued until a drop of the resin forms at the tube orifice at which time the drop-point is observed on the thermometer. This method is accurate for determining the drop point within an exactness of ±2° C.

While I have herein described the invention with considerable particularity and have given certain examples of its practice using specific proportions of starting ingredients, reaction temperatures and the like, it will be understood I do not desire or intend thereby to limit or confine myself thereto in any way as changes and modifications in the method as well as in the specific ingredients employed will readily occur to those skilled in the art and may be availed of if desired without departing from the spirit and scope of the invention as defined in the appended claims.

Having thus described my invention, I claim and desire to protect by Letters Patent of the United States:

1. A method of preparing a synthetic resin which comprises continuously heating for a period of approximately three hours under reflux conditions during stirring a mixture of a substance selected from the group consisting of p-toluene sulphonamide, mixed isomeric toluene sulphonamides and benzene sulphonamide with a water solution of formaldehyde, the latter in substantial excess of equi-molecular proportions at the beginning of the heating and maintained at a concentration in the water phase not appreciably below 15% by weight of the water present throughout such heating, while maintaining the pH value of the mass within the range of 3 to 6, separating water and uncombined formaldehyde from the resinous condensate, heating the latter to approximately 130° C. and maintaining it substantially at that temperature until the drop point has attained a pre-determined value substantially higher than that at the beginning of the heating, supplying to the condensate an additional quantity of formaldehyde solution, heating the second mixture under reflux conditions during stirring for a further period of approximately three hours and maintaining substantially said pH value in the mass, separating water and uncombined formaldehyde from the condensate, reheating the latter to a temperature of approximately 130° C. and maintaining it at that temperature until the drop point of the condensate has reached another substantially higher predetermined value.

2. In a method of preparing a synthetic resin, heating a mixture of p-toluene sulphonamide and a water solution of formaldehyde in substantial excess of equi-molecular proportions, during the heating adjusting the pH value of the mass to greater than 4 and less than 5 and supplying water solution of formaldehyde to the mixture to thereby maintain the concentration of formaldehyde in the water phase not appreciably below 15% by weight of the water present and refluxing the vapor produced by the heating for a period in the neighborhood of three hours, thereafter cooling the mass and separating from the condensation product uncombined formaldehyde solution in water.

3. In a method of preparing a synthetic resin, heating a mixture of p-toluene sulphonamide and a water solution of formaldehyde in substantial excess of equi-molecular proportions, during the heating adjusting the pH value of the mass to greater than 4 and less than 5 while maintaining the concentration of formaldehyde in the mass not appreciably below 15% by weight of the water present and refluxing the vapor produced by the heating for a period in the neighborhood of three hours, thereafter cooling the mass and separating from the condensation product uncombined formaldehyde and water, and then heating the condensation mass to approximately 130° C. and maintaining it at that temperature until the properties of the condensate have attained desired values.

4. In a method of preparing a synthetic resin from a mixture containing a substance selected from the group consisting of p-toluene sulphonamide, mixed isomeric toluene sulphonamides and benzene sulphonamide with a substantial excess over equi-molecular quantity of formaldehyde in a water solution containing approximately 35% formaldehyde and a relatively small proportion of sodium hexametaphosphate, heating the mixture for a period of approximately three hours while stirring it and maintaining a pH value in the water phase thereof in the neighborhood of 4–5 and the concentration of formaldehyde in the water phase not appreciably below 15% by weight of the water present while returning to the mass vapors produced by the heating, cooling the mass and separating the condensation product from residual uncombined formaldehyde and water.

5. A method of preparing a synthetic resin which comprises mixing with formaldehyde in water solution in the presence of a hexametaphosphate a substance selected from the group consisting of p-toluene sulphonamide, benzene sulphonamide and mixed isomeric toluene sulphonamides, the formaldehyde being present in the mixture in substantial excess of equi-molar proportions, boiling the mixture under reflux conditions for a period of approximately three hours while maintaining the pH value of the mass within the range of 3–6 and the formaldehyde concentration in the water phase not appreciably below 15% of the weight of water present, separating water and uncombined formaldehyde from the resinous condensate, heating the latter to approximately 130° C. and maintaining it at that temperature until the drop point of the concentrate has reached a value substantially higher than at the beginning of the heating.

6. A method as defined in claim 5 in which an alkali metal hexametaphosphate is present in the reaction mass during the reaction.

7. A method as defined in claim 5 in which urea is present in the reaction mass during the reaction.

8. A method as defined in claim 5 in which an alkali metal hexametaphosphate and urea are present in the reaction mass during the reaction.

9. A method as defined in claim 5 in which sodium hexametaphosphate is present in the reaction mass during the reaction.

ERIK BIRGER BENGTSSON.

REFERENCES CITED

The following references are of record in the file of this patent:

UNITED STATES PATENTS

| Number | Name | Date |
|---|---|---|
| 2,545,174 | Sido | Mar. 13, 1951 |

FOREIGN PATENTS

| Number | Country | Date |
|---|---|---|
| 375,843 | Great Britain | June 27, 1932 |

OTHER REFERENCES

Dahlen, The Svedberg, pages 234–245, Uppsala, Sweden.

D'Alelio Experimental Plastics and Synthetic Resins (1946), pages 146–147, John Wiley, N. Y.